United States Patent [19]
Messenger

[11] 3,876,006
[45] Apr. 8, 1975

[54] METHOD OF ALLEVIATING LOST CIRCULATION
[75] Inventor: Joseph U. Messenger, Dallas, Tex.
[73] Assignee: Mobil Oil Corporation, New York, N.Y.
[22] Filed: Aug. 5, 1974
[21] Appl. No.: 494,442

Related U.S. Application Data
[63] Continuation of Ser. No. 360,206, May 14, 1974, abandoned.

[52] U.S. Cl.................................. 166/293; 175/72
[51] Int. Cl........................................... E21b 33/138
[58] Field of Search....................... 166/293; 175/72

[56] References Cited
UNITED STATES PATENTS
2,800,964 7/1957 Garrick........................... 166/293 X
2,990,016 6/1961 Goins et al......................... 166/293
R24,942 2/1961 Howard et al....................... 166/293

*Primary Examiner*—David H. Brown
*Attorney, Agent, or Firm*—C. A. Huggett; Henry L. Ehrlich

[57] ABSTRACT

This specification discloses a method of alleviating the loss of drilling fluid into lost circulation zones of an incompetent subterranean formation penetrated by a well. There is mixed within the well and immediately above the incompetent formation an aqueous liquid and a slurry of a nonaqueous liquid and a hydratable material to form an aqueous liquid-rich soft plug. This plug is displaced down the well and into the lost circulation zones to alleviate the loss of drilling fluid into these zones.

6 Claims, 1 Drawing Figure

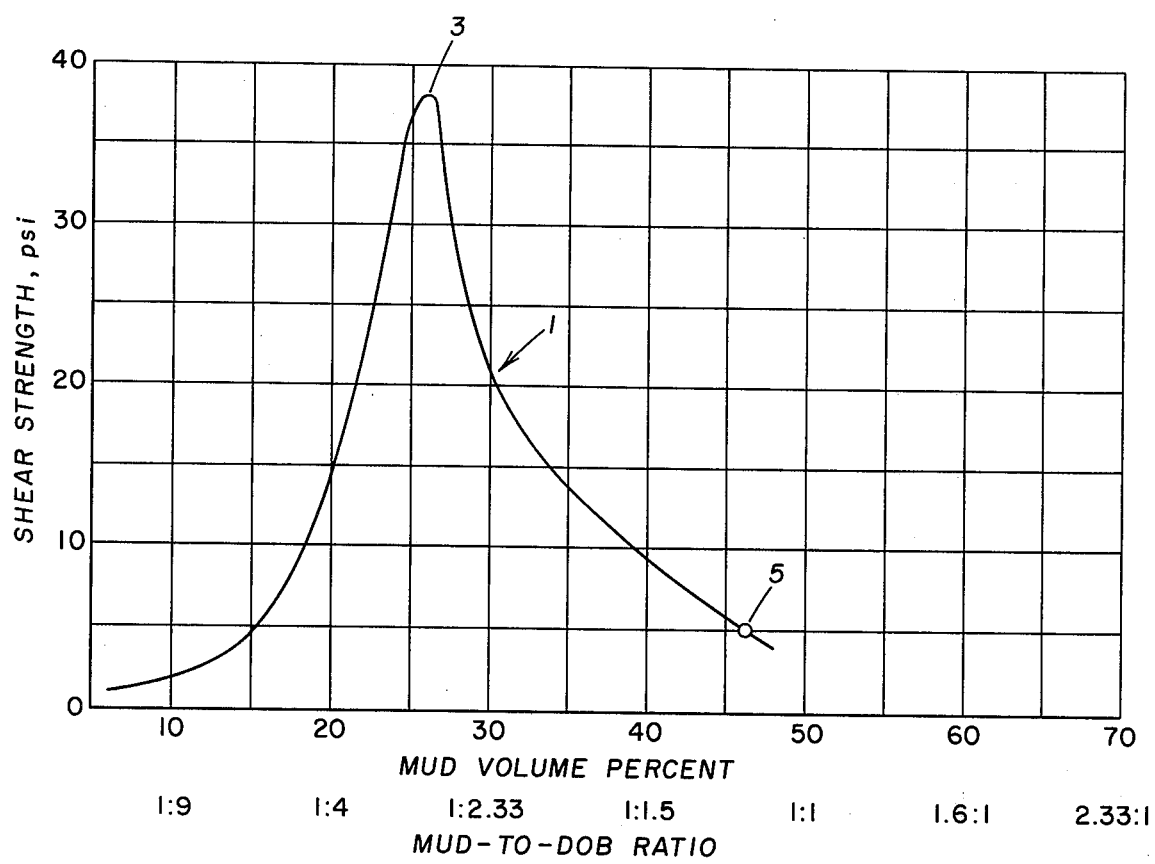

METHOD OF ALLEVIATING LOST CIRCULATION

This is a continuation, of application Ser. No. 360,206, filed May 14, 1974 now abandoned.

BACKGROUND OF THE INVENTION

This invention relates to the drilling of wells into the earth and, more particularly, to alleviating the loss of drilling fluids into incompetent subterranean earth formations penetrated by the well.

Rotary drilling techniques are commonly employed for extending wells into the earth. In the rotary drilling of a well, a drill bit is attached to a drill string and is rotated in contact with the earth, thereby cutting and breaking the earth and forming a well which is extended thereinto. Drilling fluid is circulated through the well for such purposes as removing the cuttings therefrom, lubricating the bit and drill string, and applying hydrostatic pressure in the well to control the flow of fluids into the well from the formations penetrated by the well. In extending the well into the earth, incompetent subterranean formations are sometimes penetrated that allow whole drilling fluid to flow thereinto. This condition is often referred to as "lost circulation" and involves the loss of unacceptably large amounts of drilling fluid into the formation penetrated by the well. Such an incompetent formation is sometimes referred to as a "lost circulation zone," though the drilling fluid may enter the formation in significant amounts only at particular points or locations of the formation. The term "lost circulation zone" more commonly is used to refer to the particular points or locations of the incompetent formation where the drilling fluid enters the formation. The incompetent formation may be a formation which has unusually high permeability or naturally occurring fractures or fissures or may be a weak formation which is fractured at points of weakness by the hydrostatic pressure of the drilling fluid. General practice dictates setting casing in the well prior to drilling into the incompetent formation and then proceeding with the drilling of the well utilizing techniques designed to minimize the loss of circulation. Many times, however, in spite of all preventative efforts, loss of circulation occurs.

When loss of circulation occurs it is necessary to resort to remedial efforts in order to recover or regain circulation such that the well may be extended deeper into the earth. Various techniques have been described for recovering circulation. For example, in U.S. Pat. No. 2,801,077 which was reissued as Re. 24,942 there is described a technique of regaining circulation in a well. The lost circulation zone is located and a drill pipe with a mixing sub on the lower end thereof is lowered into the well until the sub is at about the depth of the lost circulation zone. A slurry is formed of a nonaqueous liquid and hydraulic cement and a clay. This slurry is pumped down the well through the drill pipe while simultaneously an aqueous liquid is pumped down the well through an annulus so as to mix at the location of the lost circulation zone the slurry with the aqueous liquid. The clay and cement contained in the slurry hydrate substantially instantaneously and form a mixture which is too viscous to pump. This mixture is then displaced into the formation. In U.S. Pat. No. 2,800,964 there is described a somewhat similar process wherein a bridging material, a nonaqueous slurry of finely divided clay, and an aqueous liquid such as a drilling mud, are combined within a well to produce a mixture in the well which is too viscous or plastic to be pumped by the rig pumps but which can be displaced into a lost circulation zone by pumping mud against it using the surface pumps.

In U.S. Pat. No. 2,990,016 there is described another process for curing lost circulation. A concentrated slurry of a hydratable material in an inert carrier liquid is pumped down the borehole in one well channel and substantially simultaneously an aqueous liquid is pumped down the borehole through a second well channel. The two liquids are mixed in the borehole adjacent to the formation causing lost circulation to partially hydrate the hydratable material. A stiff sealing composition is formed by the partial hydration of the hydratable material and is squeezed into the lost circulation formation wherein further hydration of the hydratable material occurs causing it to swell and harden to close the fissures.

The above techniques require that the point or location of drilling fluid loss into the formation be accurately located. This requires that surveys be run to determine the location of the point of loss. Surveys which may be run to determine the point of loss include temperature, radioactive tracer, spinner, and resistivity surveys. After locating the point of loss, the well may be treated by forming a stiff mixture which is too viscous to pump adjacent the point of loss. The point of loss must necessarily be located accurately, however, because the stiff mixture cannot be displaced for any substantial distance down the well. If there are multiple points of loss which are separated a substantial distance one from the other, separate treatments must be run for each point of loss to form the stiff mixture adjacent each point of loss.

SUMMARY OF THE INVENTION

This invention relates to a method of alleviating the loss of drilling fluid into a lost circulation zone of an incompetent formation that is penetrated in the drilling of a well. The lower end of a drill string is positioned in the well imediately above the incompetent formation and a slurry of a nonaqueous liquid and a hydratable material is pumped at a first rate down the drill string. Concomitantly, an aqueous liquid is pumped at a second rate down an annulus of the well to mix within the well the slurry and the aqueous liquid and form an aqueous liquid-rich plug which is then displaced down the well and into the lost circulation zone.

BRIEF DESCRIPTION OF THE DRAWING

The drawing is a graph of shear strength versus the ratios of the volume of aqueous liquid to the slurry volume of nonaqueous liquid and hydratable material used in forming a plug for alleviating the loss of circulation.

DESCRIPTION OF THE PREFERRED EMBODIMENTS

This invention is directed to a method of drilling a well and in particular to a method of controlling or alleviating the loss of drilling fluid into an incompetent subterranean formation penetrated by the well.

In the drilling of a well it is many times the case that at the time lost circulation occurs, hundreds or thousands of feet of earth formations have been penetrated below the last string of casing and the exact point of loss is unknown. The applicant has discovered a technique whereby such a well may be treated and circulation restored without first running surveys to determine the exact point or points where loss of drilling fluid is occurring. The applicant has also discovered a technique whereby lost circulation into multiple points of loss that are separated a substantial distance one from the other may be restored by a single treatment. In addition, the applicant has discovered a technique whereby potential lost circulation zones are treated to prevent the later loss of circulation into these zones.

The applicant's invention resulted from a study of forming downhole viscous mixtures of an aqueous fluid and a slurry of hydratable material in a nonaqueous carrier fluid to alleviate lost circulation problems. This study was made possible by laboratory apparatus that was designed to simulate the downhole mixing of the aqueous fluid and the slurry of hydratable material in a nonaqueous carrier fluid and the displacing of the viscous mixture into a fracture which simulated a lost circulation zone. The fracture was formed from two sheets of plexiglass attached together using springs such that the force required to open the fracture could be simulated. The drill string and well were formed by concentric plexiglass tubing.

In carrying out tests using this apparatus, there was prepared an aqueous mixture which simulated a liquid aqueous drilling mud and a slurry of bentonite in diesel oil. The diesel oil-bentonite was pumped down the internal tubing and the simulated drilling mud was pumped down an annulus and mixing took place at the lower end of the internal tubing to form a plug. This plug or mixture was then displaced down the well and into the vertical fracture. Thereafter, the plexiglass plates were disassembled and the shear strength of the plug was determined using a cone on a penetrometer. A plot of shear strength versus mud to diesel oil-bentonite ratio is shown in FIG. 1.

The laboratory tests indicated that the prior art techniques for mixing downhole slurries of hydratable material in a nonaqueous carrier fluid with an aqueous fluid such as a drilling mud resulted in such stiff mixtures or plugs that they could not be displaced any substantial distance down the simulated well and into the simulated fracture. This indicated that these stiff plugs must necessarily be placed adjacent or very near the points of loss to avoid the setting up of the plugs in the well with the attendant failure to cure the lost circulation problem. It was also found that "aqueous liquid-rich soft plugs" could easily be displaced substantial distances down the simulated well and into the vertical fracture. Further, it was found that these aqueous liquid-rich soft plugs developed sufficient shear strength to alleviate the loss of drilling fluid into lost circulation zones. It was found that lost circulation could be alleviated by the use of soft plugs that have a shear strength of 5 psi or less.

The term "aqueous liquid-rich soft plugs" is used to mean plugs formed with an excess of aqueous liquid over that required to completely hydrate the hydratable material in the slurry of nonaqueous liquid.

By the present invention an incompetent subterranean formation is treated to alleviate the loss of drilling fluid into lost circulation zones without first running surveys to determine the points or locations where the loss is occurring. Further, by another embodiment, the formation may be treated both to alleviate the loss of drilling fluid into active lost circulation zones and to strengthen and seal potential lost circulation zones and thereby alleviate further problems.

In accordance with the method of this invention, when drilling a well and loss of drilling fluid into a lost circulation zone of an incompetent subterranean formation occurs, the drill string is raised from the bottom of the well and positioned such that the lower end of the drill string is located immediately above the incompetent formation. Generally, in practice, the drill string is positioned such that the drill bit is located within the lowest string of casing and slightly above the casing shoe. The drill bit may be removed and a mixing sub installed if desired to ensure better mixing though normally this is not necessary. A slurry of a nonaqueous liquid and a hydratable material is mimxed at the surface. Diesel oil is a preferred non-aqueous liquid because of its low cost and ready availability at most wells though other nonaqueous liquids such as other light hydrocarbon oils, alcohols, etc. may be used. A preferred hydratable material which may be mixed into the nonaqueous liquid is finely divided bentonite which is also readily available at most wells and hydrates rapidly though other hydratable materials such as attapulgite or cement or mixtures thereof could be used. Generally, it is desired to form a relatively concentrated slurry which may contain on the order of 300 to 400 pounds of hydratable material per barrel of nonaqueous liquid. This slurry is pumped into the drill string and down the well, usually preceded and followed by a nonaqueous spacer. The annulus about the drill string is filled with an aqueous liquid, usually an aqueous drilling liquid (mud), and concomitantly with pumping the slurry down the drill string the aqueous liquid is pumped down the annulus. The slurry of nonaqueous liquid and hydratable material is pumped down the drill string at a first rate while concomitantly the drilling mud is pumped down the annulus at a second rate to mix within the well at the lower end of the drill string the slurry with the aqueous liquid and form an aqueous liquid-rich soft plug. The first and second rates are controlled to ensure that the aqueous liquid-rich soft plug that is formed has an amount of aqueous liquid in excess of that amount required to completely hydrate the hydratable material. Thereafter, the aqueous liquid-rich soft plug is displaced down the well and into the incompetent subterranean formation. This soft plug may be displaced down the well for substantial distances until it flows into the lost circulation zone of the incompetent formation and thereby alleviates the loss of drilling fluid from the well. A preferred ratio of the second pumping rate (aqueous liquid volume) to the first rate (volume of slurry) has been found to be about at least 2 to 1. This preferred pumping ratio ensures that the soft plug that is formed has an amount of aqueous liquid in excess of that required to completely hydrate the hydratable material, has a yield strength no greater than about 5 psi, and can readily be displaced down the well for substantial distances.

In accordance with another embodiment of this invention an incompetent subterranean formation is treated to plug that portion of the formation into which a loss of drilling fluid is occurring and to break down and then plug other weak portions of the formation which are potential lost circulation zones. In carrying out this embodiment, it is necessary that the aqueous liquid-rich soft plug that is formed be free of bridging agents to avoid initially bridging the potential weak zones in the formation and thereby preventing their being broken and subsequently strengthened with the soft plug. In accordance with this embodiment, the drill string is again positioned as previously described and a slurry of a nonaqueous liquid and a hydratable material that is free of bridging agents is pumped at a first rate down the drill string while concomitantly an aqueous liquid that is free of bridging agents is pumped at a second rate down the annulus to mix within the well and form an aqueous liquid-rich soft plug. This plug is then displaced down the well and into the lost circulation zones by a liquid which is pumped down the drill string or annulus. A squeeze pressure is applied and the aqueous liquid-rich soft plug is squeezed into the incompetent formation, thereby plugging those portions which are taking drilling fluid. The squeeze pressure is then increased until the pressure is built up to a predetermined pressure which is at least equal to the pressure which will be applied by the drilling fluid upon subsequent drilling. During this build-up of the squeeze pressure, potential weak zones in the formation break down and the soft plug is squeezed thereinto. Thus, the entire formation penetrated by the well below the lowest string of casing may be treated to alleviate the loss of fluid into the initial lost circulation zone and also to break down and treat other potential lost circulation zones. In accordance with a further preferred embodiment the aqueous liquid-rich soft plug is formed by mixing about 2 parts by volume of aqueous liquid with 1 part by volume of slurry of a nonaqueous liquid and a hydratable material. Using this ratio ensures that the soft plug may be pumped down the well for the entire distance of the exposed formation to the point of loss. In carrying out the build-up of the squeeze pressure to the predetermined pressure, the above ratio may be gradually decreased as needed to enable the squeeze pressure to be built up to the predetermined value. However, to avoid the soft plug from becoming too viscous to pump down the well for a substantial distance this ratio should not be decreased to a value which corresponds with the amount of aqueous liquid required to completely hydrate the hydratable material.

Referring to the drawing for a further description of this invention, there is seen a graph of shear strength versus the ratios of the volume of aqueous liquid to the slurry volume of nonaqueous liquid and hydratable material used in forming a plug for alleviating the loss of circulation into a lost circulation zone. The curve 1 was formed by plotting data obtained using the above-described laboratory apparatus with a 10.2-pound per gallon aqueous drilling fluid (mud) and a slurry of diesel oil and bentonite to form a diesel oil-bentonite (DOB) mixture or plug. The peak 3 of the curve 1 represents the maximum shear strength obtained. This maximum shear strength is obtained when the ratio of mud to slurry is that ratio which provides an amount of aqueous fluid which is just sufficient to completely hydrate the hydratable material in the slurry. The maximum shear strength obtained for the 10.2-pound per gallon mud and diesel oil-bentonite slurry as represented by curve 1 was about 36 psi. As mentioned above, plugs which developed a shear strength of 5 psi or less were found to be sufficiently strong to effectively control the loss of drilling fluid into the lost circulation zones. These plugs having a shear strength of 5 psi or less could easily be displaced down the well and into the lost circulation zone. In distinction to this, the plugs formed having a shear strength near the maximum could be displaced down the well only with difficulty. Therefore, in accordance with applicant's invention, aqueous liquid-rich soft plugs are formed downhole at the lower end of the drill string and are displaced down the well and into the lost circulation zone. The aqueous liquid-rich soft plugs formed in accordance with the applicant's invention fall along curve 1 (and similar curves for other mud-slurry mixtures) to the right of the peak 3.

In the embodiment wherein a bridging agent free aqueous liquid-rich soft plug is formed and squeeze pressure is applied to plug active and potential lost circulation zones, it is preferred that sufficient aqueous fluid be used to provide a plug having a shear strength of 5 psi or less as indicated by point 5 on curve 1. This plug may be readily displaced down the well and into the active and potential lost circulation zones. If squeeze pressure does not build up, then the volume of aqueous liquid used in forming the plug is reduced. This results in increasing the shear strength of the plug and thus in shifting point 5 up curve 1 toward peak 3. This reduction in the volume of aqueous liquid may be done on a gradual basis and the reduction is only carried out until the squeeze pressure builds up to the predetermined value. In no case is the reduction in the volume of aqueous liquid carried so far as to form a plug having a maximum shear strength as indicated by peak 3.

I claim:

1. In the drilling of a well below the lower extremity of casing set in said well the method of alleviating the loss of drilling fluid into an unlocated lost circulation zone of an incompetent formation penetrated by said well, comprising the steps of:
   a. positioning the lower end of a drill string in said well immediately above said lower extremity of casing set in said well;
   b. pumping at a first rate down said drill string a slurry of a nonaqueous liquid and a hydratable material;
   c. concomitantly pumping at a second rate down an annulus of said well an aqueous liquid to mix within said casing said slurry and said aqueous liquid and form an aqueous liquid-rich soft plug; and
   d. displacing said aqueous liquid rich soft plug down said well and into said unlocated lost circulation zone.

2. The method of claim 1 wherein the ratio of said second rate to said first rate is at least 2 to 1.

3. In the drilling of a well below the lower extremity of casing set in said well the method of alleviating the loss of drilling fluid into an unlocated lost circulation zone of an incompetent formation penetrated by said well, comprising the steps of:
   a. positioning the lower end of a drill string in said well immediately above said lower extremity of casing set in said well;
   b. pumping at a first rate down said drill string a slurry free of bridging agents of a nonaqueous liquid and a hydratable material;
   c. concomitantly pumping at a second rate down an annulus of said well an aqueous liquid free of bridging agents to mix within said casing said slurry and said aqueous liquid and form an aqueous liquid-rich soft plug that is free of bridging agents;

d. displacing said aqueous liquid-rich soft plug that is free of bridging agents down said well and into said unlocated lost circulation zone by pumping a liquid down said well; and e. applying squeeze pressure to squeeze said aqueous liquid-rich soft plug that is free of bridging agents into said incompetent formation until said squeeze pressure builds up to a predetermined pressure.

4. The method of claim 3 wherein said hydratable material consists essentially of bentonite.

5. The method of claim 4 wherein initially the ratio of said second rate to said first rate employed is about 2 to 1.

6. The method of claim 5 wherein said ratio of 2 to 1 is gradually decreased to a value no lower than the ratio required to completely hydrate said hydratable material in said slurry and concomitantly said squeeze pressure is increased to said predetermined pressure.

* * * * *

UNITED STATES PATENT OFFICE
CERTIFICATE OF CORRECTION

PATENT NO. : 3,876,006
DATED : April 8, 1975
INVENTOR(S) : Joseph U. Messenger

It is certified that error appears in the above-identified patent and that said Letters Patent are hereby corrected as shown below:

On Title page under "Related U. S. Application Data" [63] "Continuation of Ser. No. 360,206, May 14, 1974, abandoned." should read --Continuation of Ser. No. 360,206, May 14, 1973, abandoned.--

Column 1, lines 3 and 4 should read --This is a continuation of application Ser. No. 360,206, filed May 14, 1973, now abandoned.--

Column 4, line 15, "mimxed" should read --mixed--.
Column 5, line 2, after "broken" --down-- should be inserted.
Column 6, line 47, "liquid rich" should be --liquid-rich--.

Signed and sealed this 17th day of June 1975.

(SEAL)
Attest:

RUTH C. MASON
Attesting Officer

C. MARSHALL DANN
Commissioner of Patents
and Trademarks